(No Model.) 6 Sheets—Sheet 1.

E. LANHOFFER.
ELECTRICAL TRANSMISSION OF POWER.

No. 588,831. Patented Aug. 24, 1897.

(No Model.) 6 Sheets—Sheet 3.

E. LANHOFFER.
ELECTRICAL TRANSMISSION OF POWER.

No. 588,831. Patented Aug. 24, 1897.

WITNESSES:

INVENTOR
E. Lanhoffer
BY Munn & Co
ATTORNEYS.

(No Model.) 6 Sheets—Sheet 4.

E. LANHOFFER.
ELECTRICAL TRANSMISSION OF POWER.

No. 588,831. Patented Aug. 24, 1897.

Fig. 5.

WITNESSES.
John Lotka
C. Sedgwick

INVENTOR:
E. Lanhoffer
BY Munn & Co
ATTORNEYS.

(No Model.) 6 Sheets—Sheet 5.
E. LANHOFFER.
ELECTRICAL TRANSMISSION OF POWER.

No. 588,831. Patented Aug. 24, 1897.

United States Patent Office.

EMIL LANHOFFER, OF MÜLHAUSEN, GERMANY, ASSIGNOR OF ONE-HALF TO GEBRÜDER BURGHARDT, OF SAME PLACE.

ELECTRICAL TRANSMISSION OF POWER.

SPECIFICATION forming part of Letters Patent No. 588,831, dated August 24, 1897.

Application filed June 20, 1895. Serial No. 553,468. (No model.) Patented in Germany May 4, 1894, No. 8,841; in France September 13, 1894, No. 241,375; in England February 11, 1895, No. 3,003; in Russia June 10, 1895, No. 11,834; in Hungary June 16, 1895, No. 4,416, and in Austria June 27, 1895, No. 45/4,321.

*To all whom it may concern:*

Be it known that I, EMIL LANHOFFER, a subject of the German Emperor, and a resident of Mülhausen, Alsace, Germany, have invented a new and Improved Arrangement for Electrical Motive Power, (for which patents have been obtained in Austria, dated June 27, 1895, No. 45/4,321; in England, dated February 11, 1895, No. 3,003; in France, dated September 13, 1894, No. 241,375; in Germany, dated May 4, 1894, Serial No. L 8,841 II/21$^d$; in Hungary, dated June 16, 1895, No. 4,416, and in Russia, dated June 10, 1895, No. 11,834,) of which the following is a full, clear, and exact description.

The present invention relates to systems or plants for the electrical transmission of power, and particularly such systems in which it is required that the motors should be capable, within wide limits, of gradually altering their rotary speed, in contradistinction to a step-by-step variation of speed.

The object of my invention is to so arrange the electrical connections for the supply of the current in a system of the above-indicated class that the size of the motors will be reduced to a minimum for a given maximal torque and that a high running efficiency will be secured.

To these ends my invention consists in the particular arrangement and combination of parts that will be hereinafter described and claimed.

In order that my invention may be fully understood, I will first explain the theory of the improvement and then proceed to describe one practical application thereof.

The rotary speed of an electric motor may be varied within certain limits by varying the strength of the current which is employed to energize the field-magnets. It is, however, impossible to obtain in this manner any considerable alteration of the speed, since a weakening of the magnetic field involves a diminution of the torque, and if the latter is to be kept constant the strength of the current which energizes the armature-magnets is increased, and the consequence is that the motor will very soon run with a very low efficiency, as there is simultaneously an increase of the exciting-current for the armature-magnets and a decrease of the exciting-current for the field-magnets. If, however, only slight variations in the number of revolutions are to be effected, this can be readily accomplished with motors constructed for this especial purpose without altering the position of the collector-brushes—namely, by an appropriate arrangement of the regulating device for the magnets, which regulating device usually is a variable resistance. By this means the rotary speed can be varied by very slight amounts, if desired.

I will assume that $a$ is the ratio of the greatest to the smallest number of revolutions which can be obtained by varying the strength of the magnetic field of a motor without materially impairing its rate of efficiency. A is a constant which varies with the type of motor employed, E the potential at the brushes or terminals of the motor, and $n$ the number of revolutions. We then have $n_0 = \dfrac{AE}{a}$—*i. e.*, the smallest number of revolutions which can be obtained under the above-indicated conditions, with a constant potential E and $n_1 = AE$, the greatest number of revolutions which can be obtained under the same conditions. By providing a suitable regulating device any number of revolutions between $n_0$ and $n_1$ may be obtained, including a number of revolutions $n_1$.

If we have a series of numbers of revolutions forming a geometric progression in the ratio of $a$—that is, $n_0 = \dfrac{AE}{a}$, $n_1 = \dfrac{AEa}{a} = AE$, $n_2 = AEa$, $n_3 = AEa^2$, &c.—it will be obvious that with the potential $a$E the number of revolutions may be varified *ad libitum* between $n_1$ and $n_2$, with the potential $a^2$E between $n_2$ and $n_3$, and so on. The result is that by successively employing the potentials E $a$E $a^2$E to $a^n$E any number of revolutions between $n_0$ and $n_{n+1}$ may be obtained. By calculating the differences between the successive potentials it will be found that the several potentials can be expressed as sums, and therefore can be obtained by connecting in series a plurality of resistances each having a proportionate relation to one of the numbers or terms of the sum or progression.

Let $e = aE - E$ be the difference between the two lowest potentials. We then have $E = E$.
$aE = E + e$.
$a^2E = a(aE) = a(E+e) = aE + ae = E + e + ae$.
$a^nE = E + e + ae + a^2e + \ldots + a^{n-1}e$.

It will be readily seen that this is a geometrical progression, and from this theoretical consideration I have deduced the following construction: The armature of the driving or generating dynamo-electric machine is provided with a plurality of coils connected in series, the numbers of the turns of the said coils being proportionate to the terms of the above geometrical progression, and the coils are so arranged that the supply of current may be taken off between any two of them. By thus varying the potential or voltage of the current conveyed to the motors I secure the advantage that with a predetermined troque the same aggregate variation of the intensity of the magnetic field and of the current energizing the armature is required to change the speed from any number of revolutions that may be obtained with any one of the potentials enumerated to any number of revolutions that may be obtained with the next higher or next lower potential. Owing to this peculiarity the dimensions of the motors may be reduced to a minimum.

In the accompanying drawings I have illustrated one mode of carrying out my invention.

Fig. 6$^a$ is a broken sectional detail view illustrating a sliding contact forming a part of the regulating apparatus. Figs. 7$^a$ and 7$^b$ are plans of the said apparatus in two different positions.

Like characters of reference indicate corresponding parts in all the views.

Figure 1:
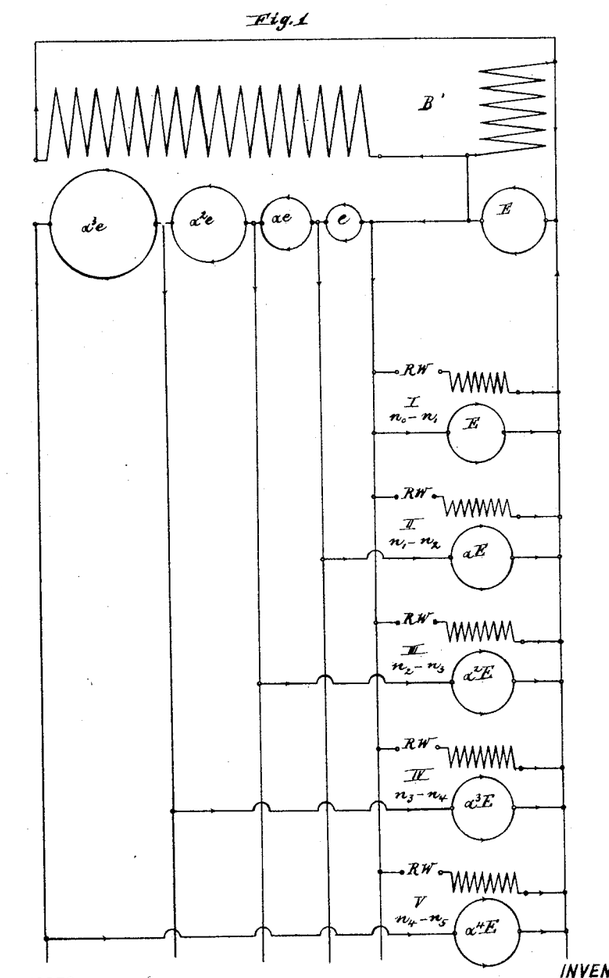
Figure 1 is a diagrammatical plan of the improvement.

B' is a dynamo-electric machine which is employed both as an exciting-machine and as a primary generating-machine. At the terminals of this machine there is the potential E, which is higher or lower, according to the size of the plant, and which is sufficient to compensate for the loss of potential due to various causes.

The circles marked $e$ $ae$ $a^2e$ $a^3e$ represent the individual coils of the main primary machine. The manners of connecting (marked 1 2 3 4 5) indicate the way in which the motor is to be connected to the primary machine in order to vary the rotary speed between the limits $n_0$ $n_5$.

R W designate the regulating apparatus for the strength of the current energizing the magnets. In order to attain the object hereinbefore mentioned, the regulating apparatus is constructed as illustrated by Figs. 2, 3, 4, 5$^a$, and 5$^b$. The purpose of this regulating or switching device is to effect in a compulsory manner and simultaneously with the varying of the potential a variation of the intensity of the field, so that the number of revolutions will not be altered by changing the position of the switch, since the influence of the changed potential will be neutralized by the simultaneous and contrary influence of the changed intensity. Another requirement of this apparatus is that it should permit the intensity of the field-magnets to be varied gradually and independently, and that for all the potentials which are employed. The limits of these changes of intensity are in direct ratio to the ratio of the geometrical progression of potentials employed—that is, the limits of these changes of intensity are the same for all potentials.

In addition to the above-enumerated functions the apparatus has the further office of a starting resistance, so that in operating this motor only one switch is used.

Figure 2:
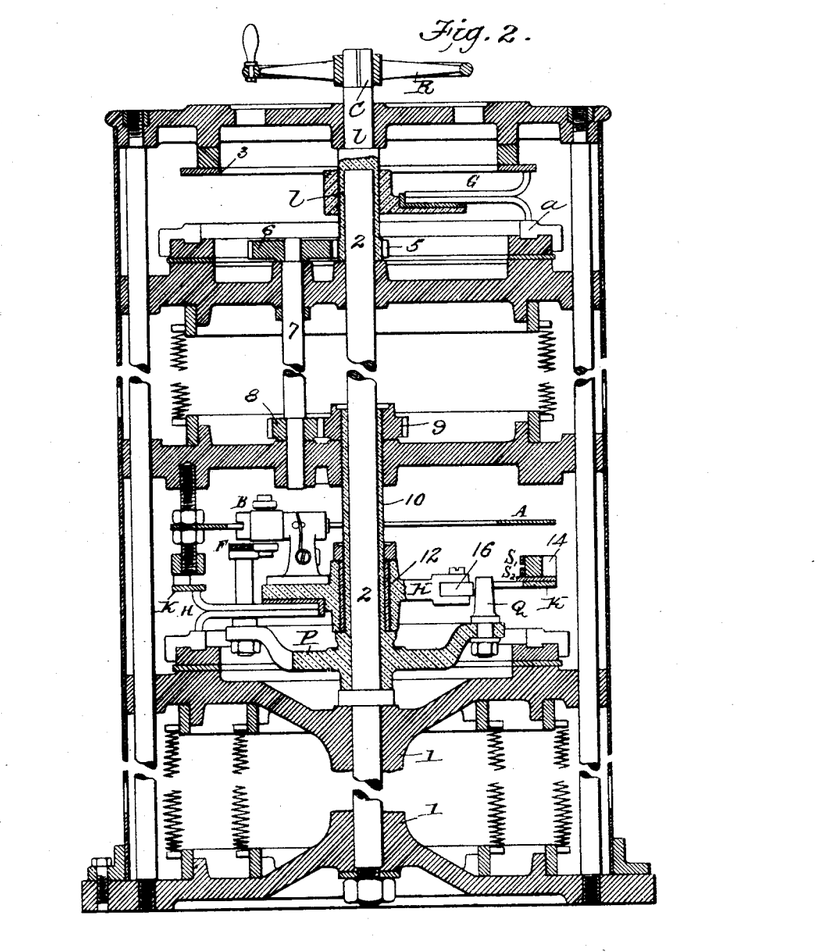
Fig. 2 is a central vertical section of a regulating apparatus or switch forming part of my invention.
Figures 3, 4:
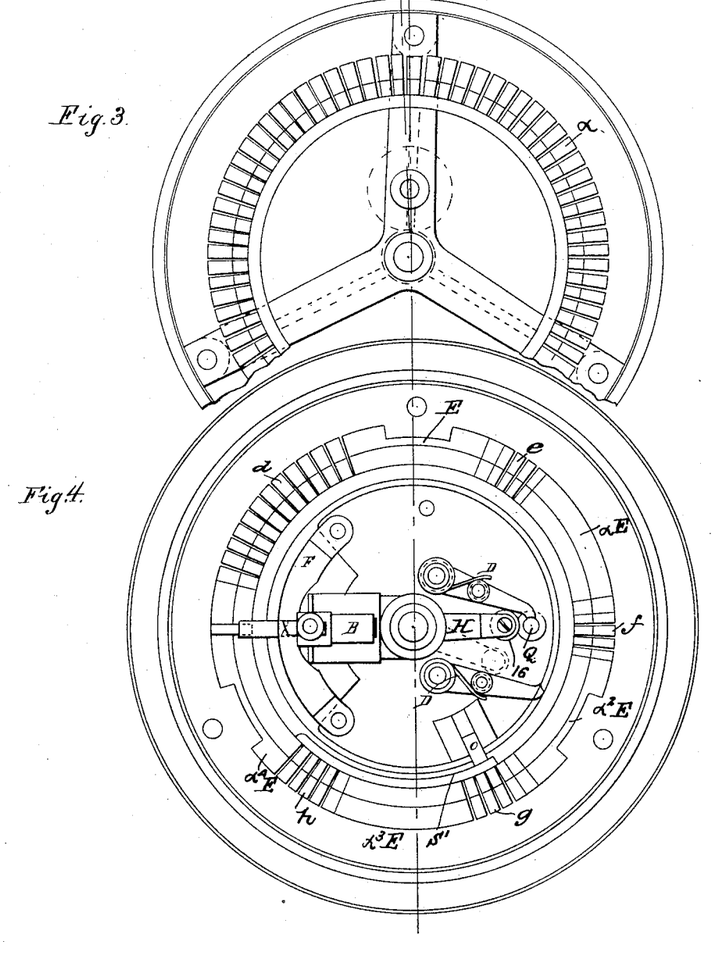
Fig. 3 is a broken plan view of the said apparatus.
Fig. 4 is another plan view thereof.
Figure 5:
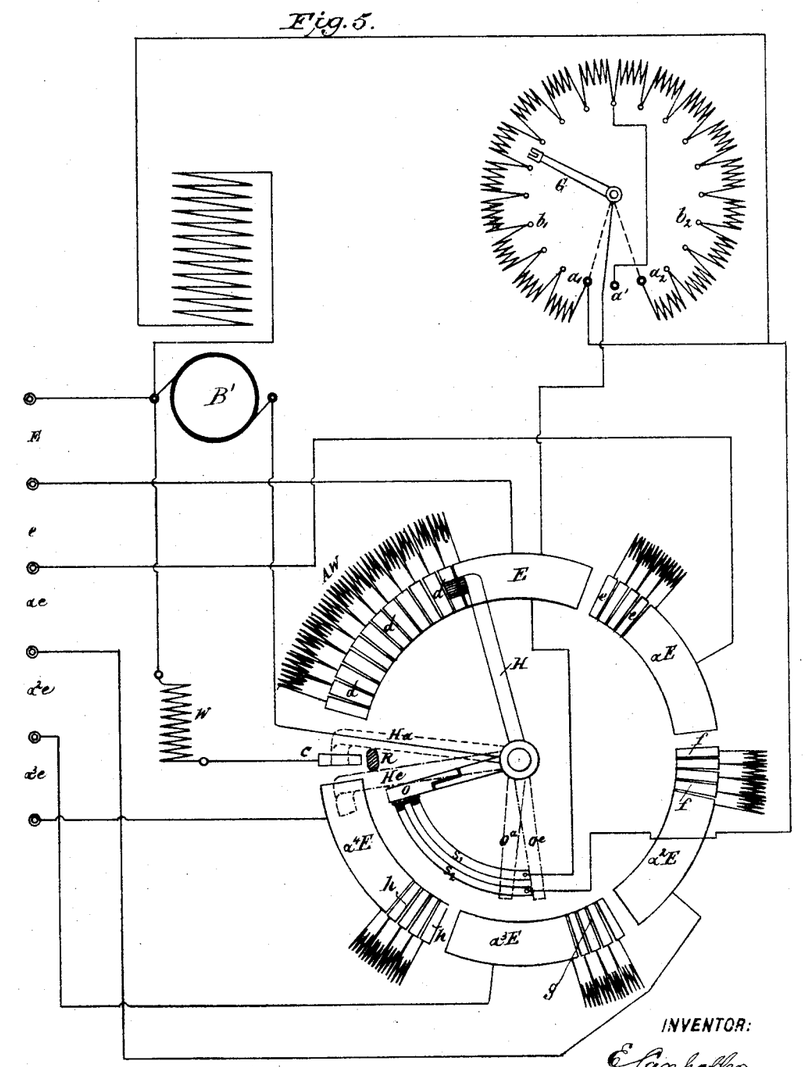
Fig. 5 is a diagrammatic plan view of the said apparatus and its electrical connections.

Figs. 2, 3, and 4 illustrate the construction of the regulating device. Fig. 5 shows its connections. The frame 1 carries a fixed shaft 2, on the upper end of which is located a sleeve $l$, having a square end C, which receives the hand-wheel R. To said sleeve is secured a contact arm or lever G, having two ends curved upward and downward, respectively, and adapted to slide, respectively, over the contact-plate 3 and a series of contacts $a$. The sleeve $l$, furthermore, carries a pinion 5, engaging another pinion 6, which is secured to the shaft 7. Said shaft carries another pinion 8, engaging a toothed wheel 9, rigidly mounted on the sleeve 10, which is loose upon the shaft 2. The lower end of the sleeve 10 is rigid with a plate P, so that by turning the wheel R a rotary motion is imparted to the arm G and a similar but slower motion to the plate P. Fig. 2 also shows a plate K, carrying an insulating-block 14, to which are secured the conducting strips or rails $s'$ $s^2$, more fully referred to hereinafter.

The apparatus consists, substantially, of two circular contact-pieces having switch-levers connected by means of gearing or equivalent mechanism. The upper contact-circle, Fig. 3 and upper part of Fig. 5, is used for varying the intensity of the field-magnets, and is so connected to the corresponding resistance that the variation of the energizing-current can be made either suddenly or gradually. This is achieved easiest and best by arranging the contacts in a circle, as illustrated in Fig. 5. When the switch-lever G is caused to pass over any contacts $a_1$ $a_2$ one way or the other—that is, from $a_1$ to $a'$ to $a_2$, or vice versa—there is a sudden change of intensity. If, however, the switch-lever G is turned from $a_1$ to $b_1$ $b_2$ to $a_2$ or in the opposite direction over the same contact-pieces, there is a progressive variation of the intensity, it being understood that the energizing-current attains its two limits of intensity when the switch-lever G rests upon the contacts $a_1$ or $a_2$.

The lower contact-circles, Fig. 4 and lower part of Fig. 5, consist of a segment $c$, employed for short-circuiting. Then next to this contacts $d$ $d$, which belong to the starting resistance AW, a segment E, which is the first segment for the change of potential, and a series of similar segments $aE$ $a^2E$ $a^3E$ $a^4E$.

The starting resistance AW has its coils connected to the first segment E. There are also additional contacts $e f g h$, which are arranged immediately before the segments which are employed to vary the potential. These additional contacts are used for the purpose of reducing to a minimum the formation of sparks which might occur at switching when the motor is running with a full load. It is intended that these small contacts should only be touched in passing by the switch-lever G, and the mechanism is so arranged that the lever cannot stop over one of the said contacts. In order to effect this, I provide the following construction: On the metal disk A, Fig. 2, there are adjustable stops V $v$, which hold the lever H at the ends of the potential-regulating segments by preventing the passage of the pawl B. By further turning the hand-wheel which is secured to the square ends of the shaft C the spring D, Fig. 4, is put under tension. The releasing-cam F, Fig. 4, is made of such a shape that the switching-lever H will be released at the very moment when the upper lever G has passed over one of the three contacts $a_1$, $a'$, or $a_2$. The levers G and H consist each of an arm curved downward and forming the switch proper and an upwardly-bent extension which only serves to convey the current from the contacts engaged by the lower end to stationary conducting-ring plates 3 and K, respectively. Thus the current does not pass axially through the switch-levers but merely upwardly through the end portions of the said levers, the current further passing from the rings 3 and K, respectively, to the field-magnets and the armature of the motor. Owing to this arrangement the insulation of the conducting parts located upon the switch-levers is materially facilitated.

In order to make the operation of the apparatus more readily intelligible, I will fully explain its movement from the time the motor is at a standstill until it reaches its maximum rotary speed. During such movement the lever H, lower part of Fig. 5, will be moved from its initial position $H^a$ to its end position $H^e$. By reference to lower part of Fig. 5 it will be seen that when the switch-lever H is in the initial position $H^a$ the armature of the motor is short-circuited by means of the resistance W. This short-circuited arrangement serves the purpose of quickly stopping the motor whenever desired. The upper switch apparatus is also in short-circuit at that time, the lever O being in the initial position indicated at $O^a$, and the conducting-rails $s'$ $s^2$ completing the circuit, so that the energizing-current for the field-magnets is at its maximum of intensity. If now the hand-wheel is turned like the hands of a watch, the lever H will be turned in the same direction by the gearing and therefore will come out of contact with the short-circuiting segment $c$ and will reach the contacts $d$ of the starting resistance. The upper part of the switch remains short-circuited and therefore inactive until the moment that the lever H comes into contact with the first potential-controlling segment E. At the same time the switch-lever G is in contact with the conducting-piece $a$, and then the upper switch portion comes into action, since simultaneously the lever O comes out of contact with the rails $s'$ $s^2$. This starts the motor with an initial number of revolutions equal to $n_0$. By further turning the hand-wheel the lever G is caused to come in contact with the contacts $a_1$ $b_1$ $b_2$ $a_2$ in the succession named, and simultaneously, owing to the decrease in the intensity of the strength of the field, the number of revolutions of the motor is increased from $n_0$ to $an_0 = n_1$. When the lever G reaches the position $b_2$, the lever H has reached the end of the potential-controlling segment E and is held in this position by the stop on the plate A, while the upper switch-lever G continues to move from $b_2$ to $a_2$, putting the spring D under tension. The lever G cannot remain stationary at any point between $a_1$, $a'$, and $a_2$, but can only be placed upon one of the extreme points $a_1$ or $a_2$. At the time the lever G passes from the position $a_2$ to the position $a_1$ the spring D is released and the lever H is thrown onto the next circuit-controlling segment $aE$. This, however, does not affect the rotary speed of the motor, which remains equal to $an_0$ or $n_1$, as before. By turning the lever G from $a_1$ over $b_1$ $b_2$ to $a_2$ the rotary speed can be increased up to $a^2n_0$ or $n_2$. While the lever G is moving from $a_2$ to $a_1$ the position of the lever H is changed in the same manner as before described, the lever finally reaching the end position $H^e$, when the motor will reach the rotary speed of $a^5n_0$.

Figure 6:
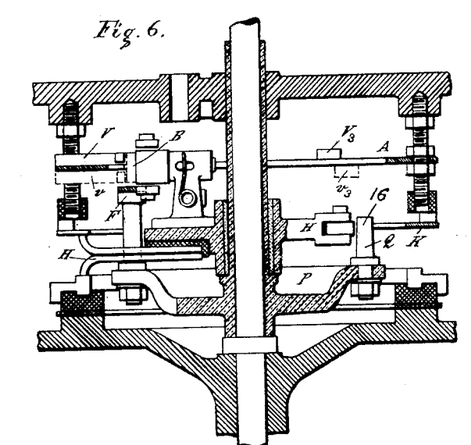
Fig. 6 is a broken sectional view of the parts represented in the central portion of Fig. 2, showing said parts in a different position.
Figure 6A:
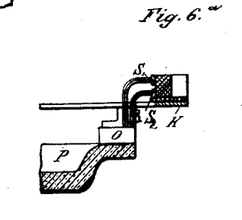
Figure 7A:
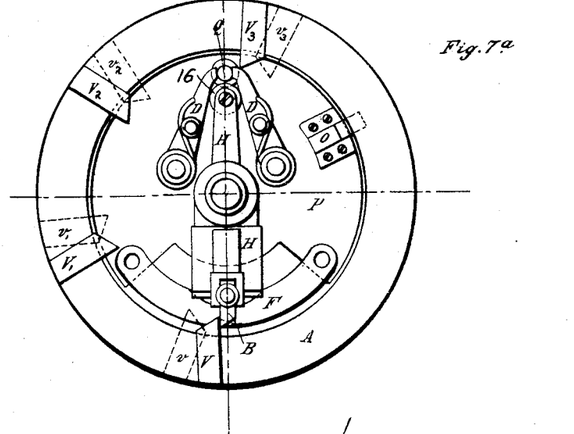
Figure 7B:
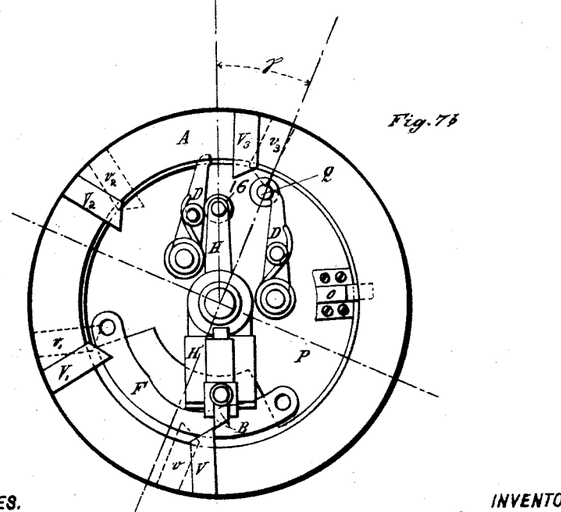

It will be obvious that by turning the hand-wheel in the opposite direction the switches will be operated in the same manner but in the reverse succession, the lever G being actuated by a catch which allows of some lost movement, whereby the moment of switching will also coincide with the time when the lever G registers with the contacts $a_1$ $a'$ $a_2$. Fig. 6 illustrates the apparatus, the section adjacent to the lever H. Figs. $7^a$ and $7^b$ illustrate the switch-lever H and plate P at the time the said lever is held stationary by the stop V, while the plate P continues to turn.

Fig. 7ᵇ illustrates the moment in which the lever H is released by the cam F, which is rigidly secured to the plate P, which is supposed to turn in the same direction as the hands of a watch. Each of the levers G and H consists of a downwardly-curved arm, which is the switch-arm proper, and an upwardly-curved portion, which serves only for conveying the current from the lower arm, which contacts with the various segments to the stationary annular plates K. It will therefore be understood that the switch-levers will convey the current from the various contacts to the rings K, located above the same, from which rings the current flows either to the field-magnets of the motor (from the lever G) or to the armature, (from the lever H.) Owing to this peculiar arrangement the contacting parts located on the switch-levers may be very readily insulated from the other parts of the mechanism.

The lever O, as shown in the plans, consists of two contact-springs, which are connected to the plate P by means of an interposed layer of an insulating material. The plate P is actuated directly from the hand-wheel of the apparatus by means of gearing, and the lever O, which is rigidly secured to the plate P, will therefore move in unison with the hand-wheel. As soon as the contact-springs attached to the lever O leave the conducting-rails $s'$ $s^2$, Fig. 2, the said lever is inactive, and from the said moment its further movement is immaterial. The position of the rails $s'$ $s^2$, Fig. 6, is such that they will be in operative relation to the lever O only when starting the motor. The sliding springs attached to the said lever connect the rails $s'$ $s^2$ to each other. The lever H is loosely fitted on the hub 10, attached to the plate P, and consists, first, of a head carrying the contact-springs and the pawl B with its housing and controlling-spring, and, further, of a tail-piece provided with an antifriction-roller 16. The lever receives its movement from the plate P by means of spring-pressed levers D D, which, being held against the stop Q, inclose the roller of the lever H between them, and thus serve as a catch to carry the lever along.

If during the movement of the apparatus the pawl B, and consequently the lever H, are released by one of the stops V V' V² V³ or $v$ $v'$ $v^2$ $v^3$, and if then the plate P continues to turn, one of the spring-controlled levers D will be put under tension, and as soon as the pawl B is released from the stop by means of the cam F the said spring-controlled lever D will force the lever H back to its normal position, which is in alinement with the stop Q—that is, the lever H when released will perform a sudden angular movement, the extent of which is indicated by the angle $\gamma$, as will will be seen in Fig. 7ᵇ.

Fig. 7ᵃ shows the lever H in its normal position and the pawl B as having just come in contact with the stop V. Fig. 7ᵇ shows the same parts after the plate P has been turned sufficiently to place the pawl B in position for release. If the operator would turn the hand-wheel back immediately after this movement of the lever H, the said lever would be arrested by the lower stop $v$, (indicated in dotted lines,) the other spring-arm D would be put under tension, and the lever would be restored to its original position in the same manner, only in the opposite direction. It will therefore be obvious that the lever H cannot remain stationary at any point which is contained within the angle $\gamma$.

The stops V V' V² V³ on the upper side of the plate A are active when the hand-wheel is turned in the same direction as the hands of a watch. The lower stops $v$ $v'$ $v^2$ $v^3$ are active when the movement takes place in the opposite direction. As will be seen in the drawings, the stops V $v$ and the pawl B are made staight on one face and beveled on the other like the latch of a door in order that the stops may arrest the movement of the pawl and lever in one direction only. By carefully and correctly gaging the resistance of the apparatus and by accurately disposing the stops the apparatus can be made to work without any sparking whatever. It is, however, necessary, in order to attain this, that the field-magnets of the motor should be made of iron in the form of lamellæ in order that the strength of the field may be varied rapidly and that the motor should have a sufficient impetus when running with a full load to retain its temporary rotary speed during the short while which is required for the variations and the switching.

It will be observed that my invention comprises a plurality of circuits or resistances connected in series, and whose individual portions or members are to each other as the terms of a geometrical progression, in combination with a regulating apparatus for varying the intensity of the field in such a manner that said field intensity is varied each time one of the series of resistances controlling the potential is inserted into the circuit or cut-out. By this arrangement I am enabled to obtain a gradual or continuous change of the speed, which obviously is far superior to a sudden or step-by-step variation, such as has been obtained by means of regulating devices as previously constructed.

Having thus described my invention, I claim as new and desire to secure by Letters Patent—

1. The herein-described system of electrical transmission of power, provided with a regulating device for the armature comprising a plurality of circuits whose potentials are to each other approximately as the terms of a geometric progression, in combination with another regulating device operatively connected to the one first named, and comprising a plurality of resistances arranged in series, said resistances controlling the intensity of the field, whereby the variation of the field intensity will be approximately the same for all differences of potentials, substantially as described.

2. An electrical regulating device, comprising a plurality of circuits connected in series and whose potentials are to each other approximately as the terms of a geometrical progression, in combination with a switch arranged to electrically connect said circuits, a series of resistances electrically connected to the said series of circuits, another switch controlling said series of resistances, and a connection between said switches whereby the resistance-controlling switch will have a continuous motion while the other switch will have a step-by-step motion, substantially as described.

3. An electrical regulating device, comprising two portions or switches, one for the variation of the electromotive force applied to the armature and the other for varying the intensity of the field, each switch comprising a series of circuits or resistances, the movable parts or levers of said switches being loosely connected in such a manner that one is compelled to move in unison with the other only at the moment the lever controlling the said electromotive force passes from one resistance to another, whereby the influence of the altered electromotive force will be neutralized by the simultaneous and contrary influence of the altered field intensity, so that the device, when employed to control the rotary speed of a motor, will not affect said speed at the moment the electromotive force is altered, substantially as described.

4. An electrical regulating device, comprising two portions or switches and means for turning or shifting the same, one switch being connected to continuously move with the operating means and the other switch being loosely connected to its companion, so that it may remain stationary relatively thereto, stops for temporarily arresting the motion of the second switch, and means for carrying the said switch over the stops by a sudden throw, substantially as described.

5. An electrical regulating device, comprising a switch, means for shifting the same, a second switch operatively connected to the first-named switch, yet capable of remaining stationary relatively thereto, stops for temporarily arresting the motion of the said second switch, and yielding projections held to move with the first-named switch and engaging the second switch to shift the same, substantially as described.

6. An electrical regulating device, comprising a switch, means for shifting the same, a second switch operatively connected to the first-named switch, yet capable of remaining stationary relatively thereto, pivoted spring-pressed levers held to turn with the first-named switch and arranged at opposite sides of the second switch to engage and shift the same, yet by their resiliency permitting the second switch to temporarily remain stationary, substantially as described.

In testimony whereof I have hereunto set my hand in presence of two witnesses.

EMIL LANHOFFER.

Witnesses:
CARL SCHOTZKI,
DAMIAN SCHIBLI.